(12) United States Patent
Bulanda

(10) Patent No.: US 7,930,805 B2
(45) Date of Patent: Apr. 26, 2011

(54) RETAINED TENSION MULTIPLE BALL LOCK CABLE TIE

(75) Inventor: John J. Bulanda, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 211 days.

(21) Appl. No.: 12/018,978

(22) Filed: Jan. 24, 2008

(65) Prior Publication Data

US 2008/0178434 A1 Jul. 31, 2008

Related U.S. Application Data

(60) Provisional application No. 60/886,552, filed on Jan. 25, 2007.

(51) Int. Cl.
*B65D 63/08* (2006.01)
*B65D 63/00* (2006.01)
*F16L 3/233* (2006.01)

(52) U.S. Cl. .............. 24/25; 24/20 R; 24/268

(58) Field of Classification Search .......... 24/25, 21, 24/20 R, 268, 16 R, 16 PB
See application file for complete search history.

(56) References Cited

U.S. PATENT DOCUMENTS

| 204,965 | A |   | 6/1878  | Gilman |
| 205,720 | A |   | 7/1878  | Blossom |
| 225,517 | A |   | 3/1880  | Gilman |
| 331,088 | A |   | 11/1885 | Sackett |
| 980,700 | A |   | 1/1911  | Swafford |
| 2,491,290 | A | * | 12/1949 | Tinnerman ............... 24/16 R |
| 3,994,521 | A |   | 11/1976 | Van Gompel |
| 4,366,602 | A |   | 1/1983  | Conlon et al. |
| 4,399,592 | A |   | 8/1983  | Chopp, Jr. et al. |
| 5,291,637 | A |   | 3/1994  | Meyers |
| 5,732,446 | A |   | 3/1998  | Blanks |
| 5,850,674 | A |   | 12/1998 | Jansen |
| 6,477,746 | B1 |   | 11/2002 | Axelsson |
| 6,647,596 | B1 | * | 11/2003 | Caveney ..................... 24/21 |
| 6,668,427 | B2 |   | 12/2003 | Bulanda et al. |
| 2004/0016085 | A1 | * | 1/2004 | Caveney ................. 24/16 PB |

FOREIGN PATENT DOCUMENTS

| EP | 1283176 A2 | 2/2003 |
| EP | 1384929 A1 | 1/2004 |

OTHER PUBLICATIONS

Hellermann Tyton Stainless Steel Ties Catalog, front cover and pp. 1-5, date unknown.

* cited by examiner

*Primary Examiner* — Robert J Sandy
*Assistant Examiner* — Rowland D Do
(74) *Attorney, Agent, or Firm* — Robert A. McCann; Christopher S. Clancy

(57) ABSTRACT

A cable tie is disclosed. The cable tie comprises an elongate metallic strap, a metallic locking head, first and second metallic roller means and first, second and third protuberances. In operation, the combination of the roller means and the protuberances serves to increase the retained tension in the elongate strap.

16 Claims, 4 Drawing Sheets

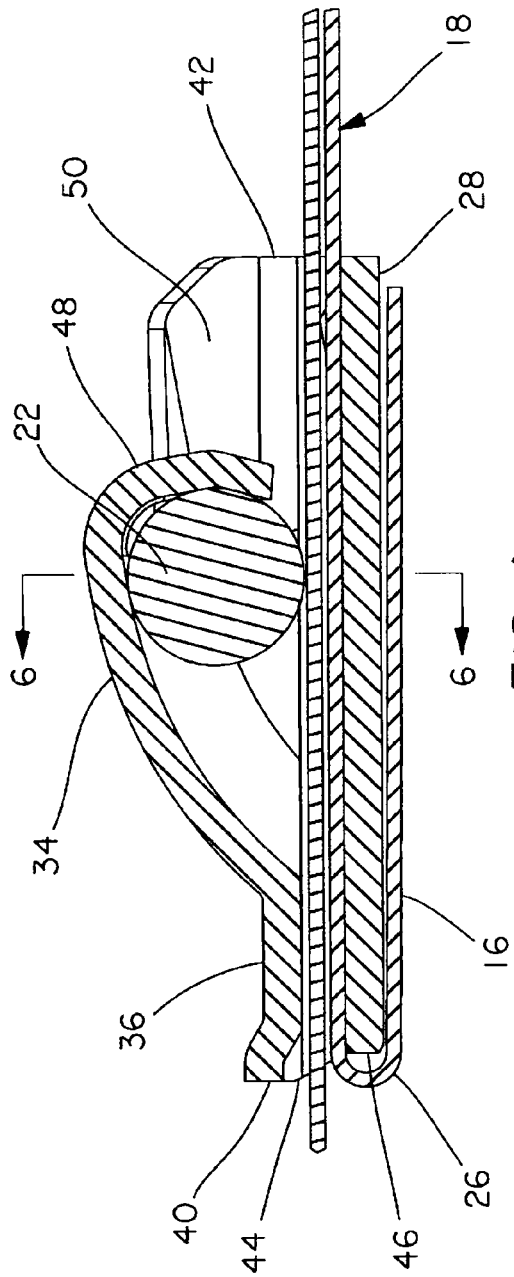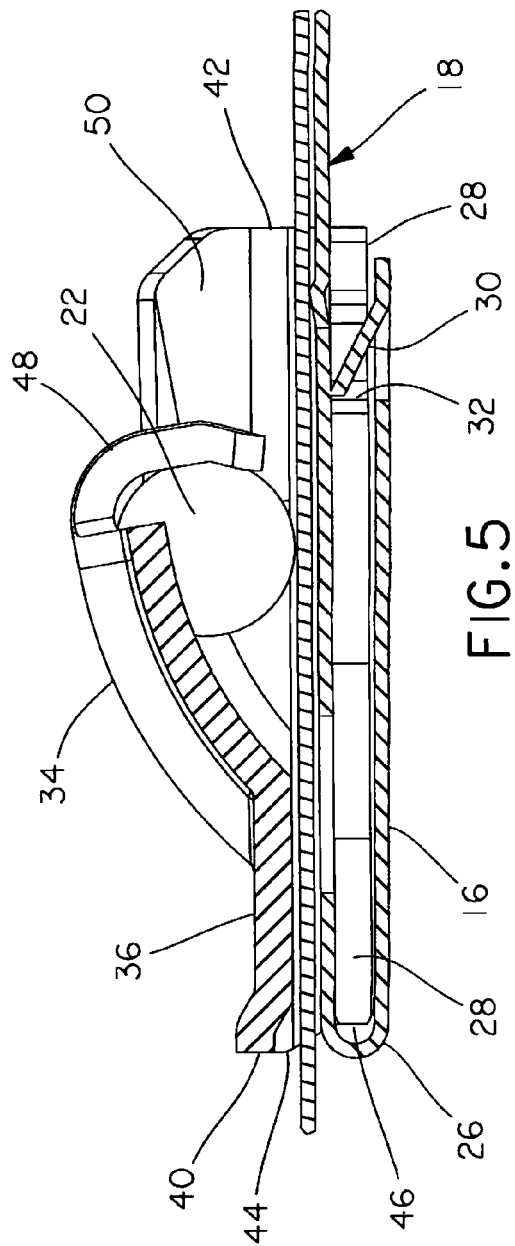

RETAINED TENSION MULTIPLE BALL LOCK CABLE TIE

CROSS-REFERENCE TO RELATED APPLICATION

This application claims priority to U.S. Provisional Patent Application No. 60/886,552, filed Jan. 25, 2007, the subject matter of which is hereby incorporated herein by reference in its entirety.

FIELD OF THE PRESENT INVENTION

The present invention is directed to a cable tie and, more particularly, to a cable tie that uses a plurality of roller means, in combination with an independent protuberance means, as the locking mechanism, to provide maximum retained tension.

BACKGROUND OF THE PRESENT INVENTION

Metallic bundling devices, such as cable ties, which incorporate locking devices or mechanisms, such as balls or roller pins, have been used for bundling a great variety of items, such as bales of cotton, since the Nineteenth Century. However, such devices were not "positive" locking; that is, such devices could not adjust for the situation in which gravity would prevent or urge the ball out of locking engagement with the strap, resulting in the release of the cable ties, and, consequently, the items intended to be restrained.

U.S. Pat. No. 4,399,592 to Chopp, Jr., et al. ("the '592 Patent") addressed this problem by teaching the addition of a raised portion or protuberance for deflecting the threaded strap away from the floor, as the threaded strap exits the locking head. This deflection ensures that the locking device is in continuous engagement with the threaded strap, regardless of the position of the locking device or the orientation of the locking head. The '592 Patent, which is assigned to the same Assignee as the present invention, is hereby incorporated by reference in its entirety.

Although the '592 Patent provided a solution to the positive locking problem of the prior art, it nevertheless was necessary to develop a cable tie having an improved tensile strength, which could result in a quicker lockup and, ultimately, a tighter bundle. U.S. Pat. No. 6,668,427 to Bulanda, et al. ("the '427 Patent") addressed this problem by teaching the use of a steeper incline on the inside of the locking head. The steeper incline allows the locking device to more quickly be positioned into a locking position. This quicker lockup then provides for a tighter contact and fit between the locking device and the strap. The '427 Patent, which is also assigned to the same Assignee as the present invention, is hereby incorporated by reference in its entirety.

Although the '427 Patent provided a solution to the need for a quicker lockup and a tighter bundle, there nevertheless existed a need for a cable tie that could be used to provide an even stronger bond between the locking device and the strap. HELLERMANNTYTON attempted to develop a metallic bundling device incorporating a multiple locking device system, such as embodied in Part Nos. MBT20XH and MBTX20HC. However, the device fails to fully provide for a strong bond between the locking devices and the strap. Among other aspects, the device does not allow for easy access to the locking devices, thus there is little or no retained tension. Moreover, the device has a lower loop tensile strength than the multiple ball metal locking tie of the present invention. Accordingly, the device does not fully maximize the potential of a multiple locking device system.

It would thus be desirable to provide a multiple ball cable tie having increased tensile strength.

It would also be desirable to provide a multiple ball cable tie having increased retained tension.

SUMMARY OF THE PRESENT INVENTION

A cable tie is disclosed. The cable tie comprises an elongate metallic strap, a metallic locking head, first and second metallic roller means and first, second and third protuberances. In operation, the combination of the roller means and the protuberances serves to increase the retained tension in the elongate strap.

BRIEF DESCRIPTION OF THE FIGURES

FIG. 4 is a sectional view of the elongate strap and the locking head of FIG. 1, which depicts one of the roller means in the threading position;

FIG. 5 is another sectional view of the elongate strap and the locking head of FIG. 1, which depicts one of the roller means in the threading position;

DETAILED DESCRIPTION OF THE PREFERRED EMBODIMENTS

Figure 1:
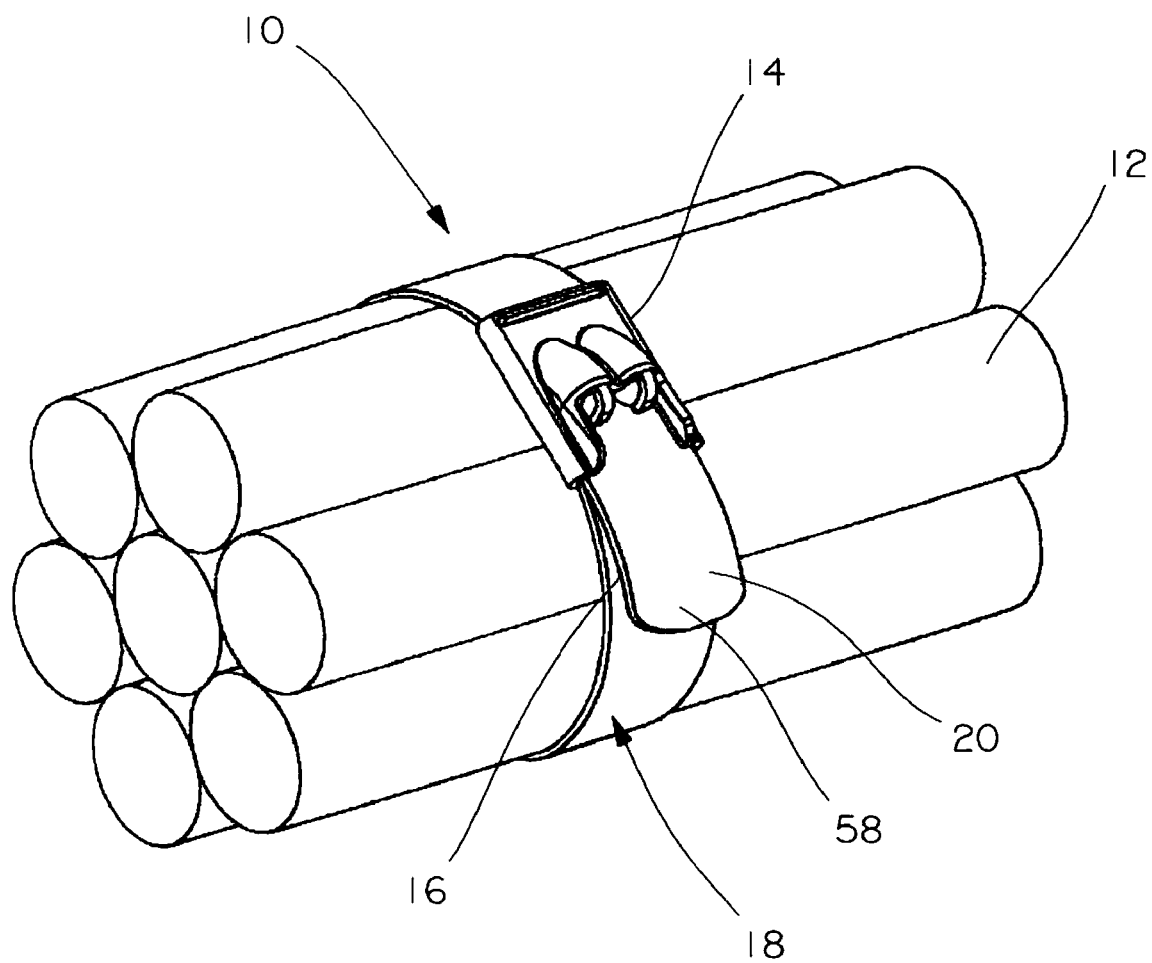
FIG. 1 is a perspective view of the retained tension multiple ball lock cable tie of the present invention shown secured around a bundle of wires.

The illustrated embodiments of the present invention are directed to a multiple-piece cable tie that uses a combination of roller means and a combination of protuberances as the locking mechanism.

Referring now to the Figures, in which like elements are represented by like reference numerals, a cable tie for bundling a plurality of elongate objects, such as wires 12, and for holding those elongate objects together, is generally indicated by reference numeral 10. Cable tie 10 preferably includes locking head 14 and a plurality of roller means (the plurality of roller means will be described in detail below). As illustrated in the Figures, locking head 14 is preferably secured to first end 16 of elongate strap 18, and is adapted to receive second end 20 of elongate strap 18.

The plurality of roller means are preferably illustrated in the form of a plurality of balls or sphere-like objects, best illustrated in FIGS. 2 and 4-7, for retaining elongate strap 18 within locking head 14. Referring to FIGS. 2 and 4-7, the plurality of roller means is represented by first roller means 22 and second roller means 24. Although, for purposes of the present invention, first roller means 22 and second roller means 24 are illustrated and described, more than two roller means may be used to achieve the tenets and teachings of the present invention. However, in most embodiments, two roller means have been proven to provide an optimum and efficient level of loop tensile strength between the plurality of roller means and elongate strap 18.

Preferably, first and second roller means 22, 24, locking head 14 and elongate strap 18 are formed of stainless steel— or any suitable material, including metals and plastic—to allow the strap to be used over a wide temperature range and to give cable tie 10 both high strength and excellent resistance to corrosion. Additionally, by means currently known in the art, elongate strap 18 may be selectively coated as shown in U.S. Pat. No. 5,103,534 ("the '534 Patent"), or coated as shown in U.S. patent application Ser. No. 10/794,613 ("the '613 Application"), published as Publication No. 2004/0172790. The disclosures of both the '534 Patent (which is assigned to the same Assignee as the present invention) and the '613 Application are hereby incorporated by reference in their entireties. Strap 18 also may be color-coded according to OSHA safety standards.

Figure 3:
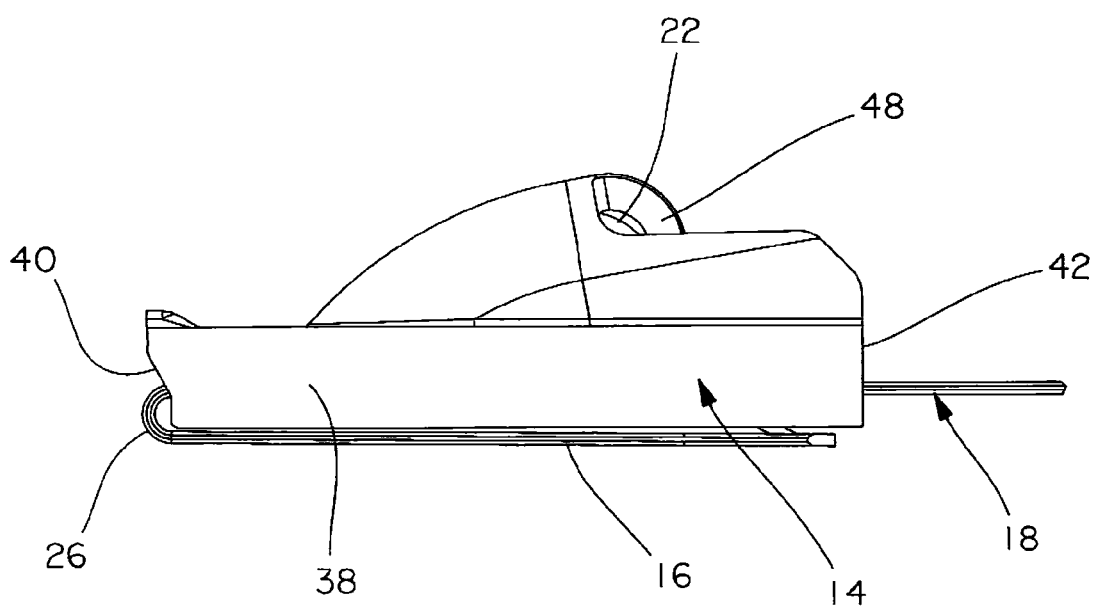
FIG. 3 is a side perspective view of the locking head of the cable tie of FIG. 1.
Figure 6:
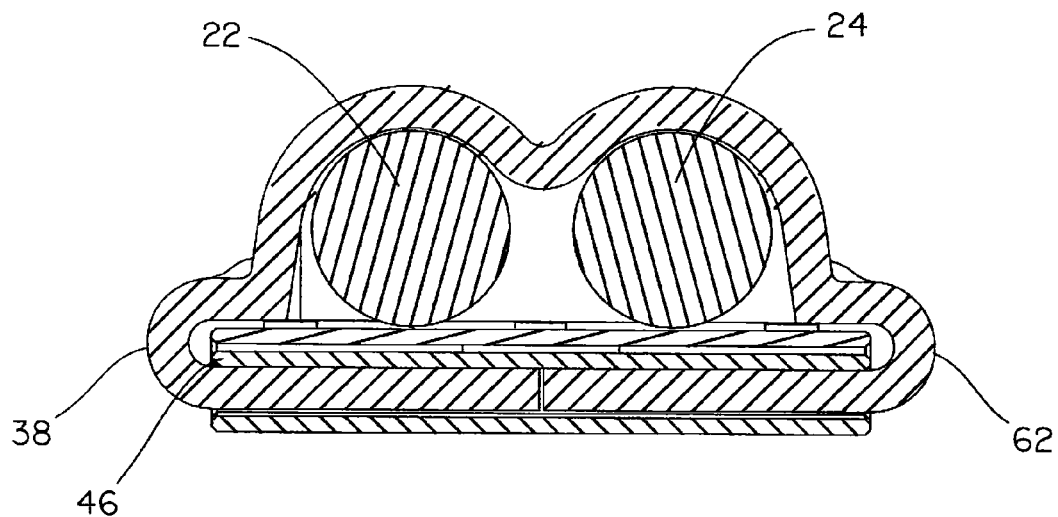
FIG. 6 is a sectional view of the cable tie of FIG. 1, taken along line 6-6 of FIG. 4.

Cable tie 10 is preferably assembled by forming hooked portion 26 within one end of elongate strap 18. This is most clearly illustrated in FIGS. 3-5, in which hooked portion 26 is formed within first end 16 of elongate strap 18. Once formed hooked portion 26 is then fitted around bottom wall 28 of locking head 14. Referring specifically to FIG. 5, first end 16 of elongate strap 18 may be further provided with finger 30 for insertion into window 32 of bottom wall 28 of locking head 14.

Referring again to FIGS. 2-7, in addition to bottom wall 28, locking head 14 further comprises roof 34 and ceiling 36. Ceiling 36 and bottom wall 28 are preferably joined by first side wall 38 and second side wall 62. Locking head 14 further includes strap entry face 40 and strap exit face 42, with strap receiving aperture 44 extending therebetween. Roof 34 and floor 46 diverge in the direction of the strap exit face 42. Each of first roller means 22 and second roller means 24 preferably has a textured or roughened surface to increase its coefficient of friction with elongate strap 18 and roof 34.

Further, as more clearly illustrated in FIGS. 4-5, each of first roller means 22 and second roller means 24 is captively held between roof 34 and floor 46 by a retention means. Referring to first roller means 22, this retention means comprises first finger 48 extending from roof 34 towards floor 46 adjacent strap exit face 42. One end of roof 34 joins ceiling 36 adjacent strap entry face 40 with spaced side wings 50 joining other parts of roof 34 and ceiling 36. Due to the view accorded by FIGS. 4-5, only first roller means 22, and the retention means associated therewith, is illustrated. The retention means with respect to second roller means 24, which comprises second finger 60, is illustrated in FIG. 7.

Referring to FIGS. 4-5, first roller means 22 is movable between a threading position, wherein first roller means 22 is disposed as engaging first finger 48, and proximate to strap exit face 42 and a locking position, not illustrated in the Figures, wherein first roller means 22 is closer to strap entry face 40 and securely engages elongate strap 18. In the threading position, first roller means 22 concurrently engages first finger 48 and roof 34. Again, due to the view accorded by FIGS. 4-5, only first roller means 22, and the threading and locking positions associated therewith, are illustrated. Nevertheless, the same positioning would be applicable to second roller means 24.

Figure 2:
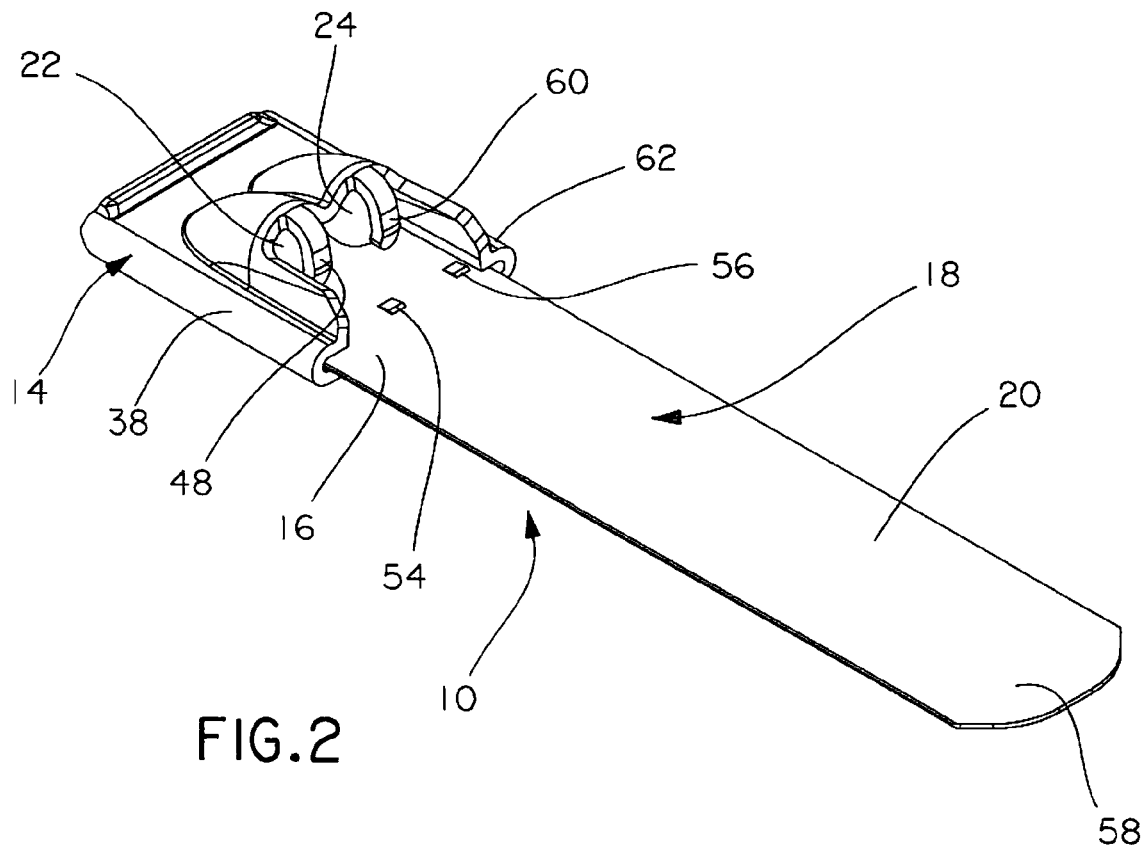
FIG. 2 is a perspective view of the cable tie of FIG. 1.
Figure 7:
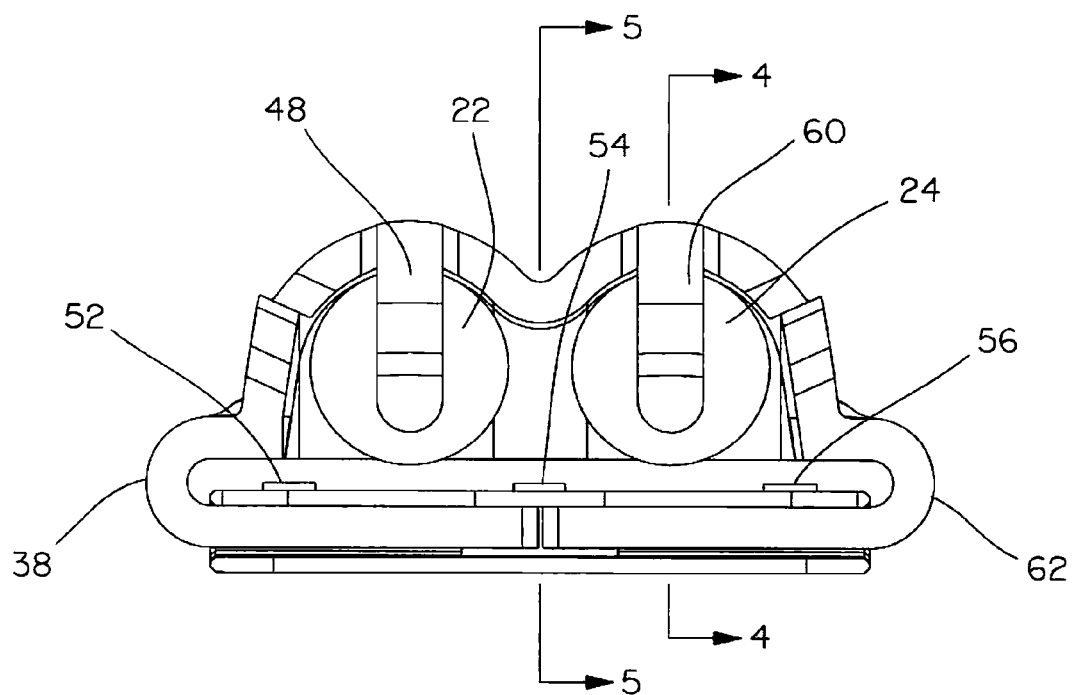
FIG. 7 is a perspective view of the strap exit face of the cable tie of FIG. 1.

Referring to FIGS. 2 and 7, elongate strap 18 further includes a plurality of protuberances 52, 54, 56 (FIG. 2 shows only second protuberance 54 and third protuberance 56; first protuberance 52 is obstructed by side wall 38). Each of first protuberance 52, second protuberance 54 and third protuberance 56 is disposed on the side of elongate strap 18 that faces first roller means 22 and second roller means 24. Preferably, first protuberance 52, second protuberance 54 and third protuberance 56 are disposed near first end 16 of elongate strap 18, just inside the boundary of locking head 14. It is preferred that there be three protuberances 52, 54, 56, as illustrated in FIGS. 2-7, and disposed in the staggered location shown (e.g., first protuberance 52 disposed on one side of first roller means 22, second protuberance 54 being disposed between first roller means 22 and second roller means 24, and third protuberance 56 disposed on one side of second roller means 24).

Referring again to FIGS. 2, 5 and 7, the placement of the protuberances is important to the functionality of the cable tie during installation. The staggered location of protuberances 52, 54, 56 creates a bi-planar spring condition with cable tie 10. In FIG. 7, cable tie 10 creates the first planar spring condition between protuberances 52, 54 and first roller means 22, and between protuberances 54, 56 and second roller means 24. As shown in FIGS. 2 and 5, elongate strap 18 creates the second planar spring condition between the top surface of hooked portion 26, protuberances 52, 54, 56 and first and second roller means 22, 24. This creates a suspended surface that is continually in contact with first and second roller means 22, 24. Under tension, elongate strap 18 creates a longitudinal concave path that further enhances the frictional locking condition between first and second roller means 22, 24, roof 34 and elongate strap 18. First and second roller means 22, 24 function independently, regardless of starting clearances, providing improved loop tensile performance and retained tension.

In operation, and again referring to the Figures, after elongate strap 18 is wrapped around the objects (e.g., wires 12) to be held, tip 58 of elongate strap 18 is inserted into locking head 14, as shown in FIGS. 4-5. Continued threading of elongate strap 18 results in positive engagement of elongate strap 18 with first roller means 22 and second roller means 24 at any angle locking head 14 is oriented. After elongate strap 18 has been tightened and released, first roller means 22 and second roller means 24 each move to their respective locking positions, where elongate strap 18 is compressively held between a combination of first roller means 22 and second roller means 24 and floor 46. Further, contact of tip 58 of elongate strap 18 with first protuberance 52, second protuberance 54 and third protuberance 56 will provide additional compression between elongate strap 18 and the combination of first roller means 22 and second roller means 24, resulting in an increase of the retained tension of cable tie 10, as compared to cable ties with only one roller means.

As discussed in U.S. patent application Ser. No. 11/550,874 ("the '874 Application"), published as U.S. Publication No. 2007/0089801, a tool may be used to apply tension to cable tie 10. Such a tool would preferably comprise setting first roller means 22 and second roller means 24 in locking head 14, and then cutting cable tie 10. Cutting cable tie 10 after setting first roller means 22 and second roller means 24 in locking head 14 results in increased retained tension. The entirety of the '874 Application, which has the same Assignee as that of the present invention, is hereby incorporated by reference.

The disclosed present invention provides a cable tie that uses the combination of a plurality of roller means and protuberances as the locking mechanism. It should be noted that the above-described and illustrated embodiments and preferred embodiments of the present invention are not an exhaustive listing of the forms such a cable tie in accordance with the present invention might take; rather, they serve as exemplary and illustrative of embodiments of the present invention as presently understood. Many other forms of the present invention exist and are readily apparent to one having ordinary skill in the art.

The invention claimed is:

1. A cable tie comprising:
    an elongate metallic strap, the elongate metallic strap having a first end, a second end and a width, the second end being disposed opposite the first end;
    a metallic locking head, the metallic locking head being secured to the first end of the elongate metallic strap, the metallic locking head being adapted to receive the second end of the elongate metallic strap, the metallic locking head having a floor, a roof, and at least one retention means, wherein the metallic locking head defines an open area from the at least one retention means to a strap exit face;
    at least two metallic roller means, each of the metallic roller means being adapted to lockingly engage the elongate metallic strap;
    at least three protuberances, wherein each of the at least three protuberances are aligned and equidistantly spaced along the width of the strap, each of the protuberances being disposed on the elongated metallic strap proximate the strap exit face of the locking head, wherein one of the protuberances being aligned with a center line of the strap and positioned in the open area of the locking head;
    wherein the combination of each of the roller means and each of the protuberances increases the tension in the elongate metallic strap.

2. The cable tie of claim 1, wherein the metallic locking head comprises a strap entry face.

3. The cable tie of claim 2, wherein the metallic locking head further comprises a strap receiving aperture extending between the strap entry face and the strap exit face.

4. The cable tie of claim 1, wherein the at least one retention means comprises at least one finger, each of the at least one finger extending from the roof adjacent the strap exit face.

5. The cable tie of claim 4, wherein the retention means is disposed adjacent to the strap exit face, the retention means adapted to captively hold the metallic roller means within the metallic locking head.

6. The cable tie of claim 1, wherein the metallic roller means is movable between a first threading position and a first locking position.

7. The cable tie of claim 6, wherein the first threading position is where the metallic roller means is disposed adjacent the strap exit face and the retention locking means.

8. The cable tie of claim 7, wherein the first locking position is where the metallic roller means is closer to the strap entry face.

9. The cable tie of claim 1, wherein a first protuberance is disposed between a first metallic roller means and a first sidewall of the metallic locking head.

10. The cable tie of claim 9, wherein a second protuberance is disposed between the first metallic roller means and a second metallic roller means.

11. The cable tie of claim 10, wherein a third protuberance is disposed between the second metallic roller means and a second sidewall of the metallic locking head.

12. The cable tie of claim 1, wherein the floor and the roof both diverge in the direction of the strap exit face.

13. The cable tie of claim 1, wherein the elongate metallic strap is comprised of stainless steel.

14. The cable tie of claim 1, wherein the elongate metallic locking head is comprised of stainless steel.

15. The cable tie of claim 1, wherein the elongate metallic locking head further comprises at least two side walls.

16. The cable tie of claim 1, wherein the second end of the elongate metallic strap is threaded through the locking head to engage the roller means, whereby after the elongate metallic strap has been tightened and the roller means are in a locked position, the elongate metallic strap engages the protuberances further retaining the tension in the cable tie.

* * * * *